R. B. SMITH.
SOUND REPRODUCER.
APPLICATION FILED OCT. 1, 1908.

908,897.

Patented Jan. 5, 1909.

2 SHEETS—SHEET 1.

WITNESSES
F. D. Sweet
W. Harrison

INVENTOR
Richard B. Smith
BY Munn & Co.
ATTORNEYS

R. B. SMITH.
SOUND REPRODUCER.
APPLICATION FILED OCT. 1, 1908.
908,897.
Patented Jan. 5, 1909.
2 SHEETS—SHEET 2.
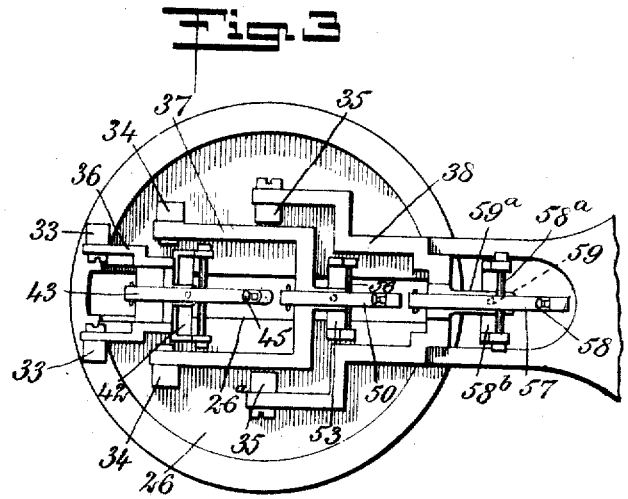
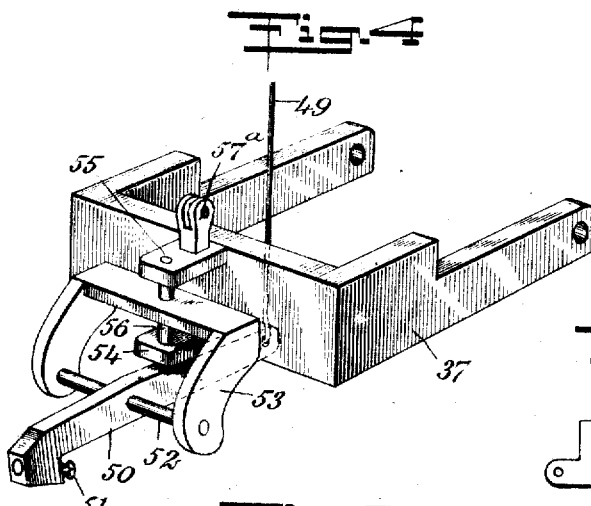
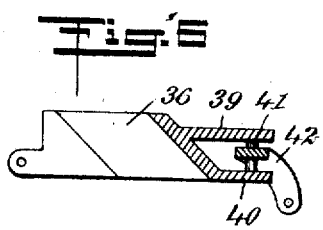
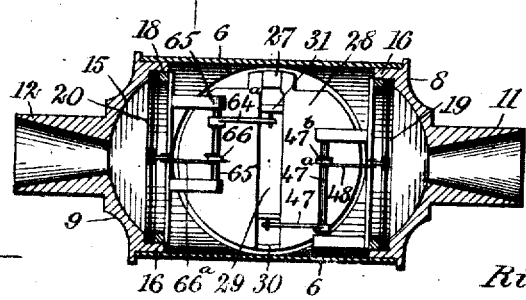
WITNESSES
F. D. Sweet
W. Harrison
INVENTOR
Richard B. Smith

UNITED STATES PATENT OFFICE.

RICHARD BARTHOLOMEW SMITH, OF NEW YORK, N. Y.

SOUND-REPRODUCER.

No. 908,897.

Specification of Letters Patent.

Patented Jan. 5, 1909.

Application filed October 1, 1908. Serial No. 455,776.

*To all whom it may concern:*

Be it known that I, RICHARD BARTHOLOMEW SMITH, a subject of the King of Great Britain, and a resident of the city of New York, borough of Manhattan, in the county and State of New York, have invented a new and Improved Sound-Reproducer, of which the following is a full, clear, and exact description.

My invention relates to sound reproducers used upon phonographs, and of the general type described in my Patent No. 799,418, dated September 12, 1905.

Among the objects sought to be accomplished by my present construction are the following: 1. to keep the stylus levers true in relation to the record grooves; 2. to mount the stylus levers upon universal joints, the axes of which are disposed in different planes crossing each other in a manner favorable for correct movements of the stylus levers; 3. a lessening of the friction of the stylus levers in their respective mountings; and 4. to simplify the construction and improve the general efficiency of the same.

Reference is to be had to the accompanying drawings forming a part of this specification, in which drawings like characters of reference indicate like parts throughout the views and in which—

Figure 1:
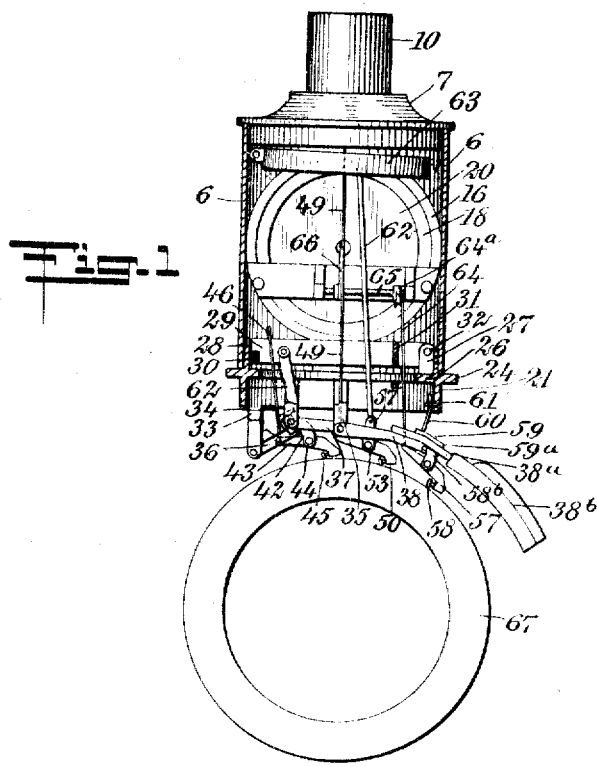
Figure 2:
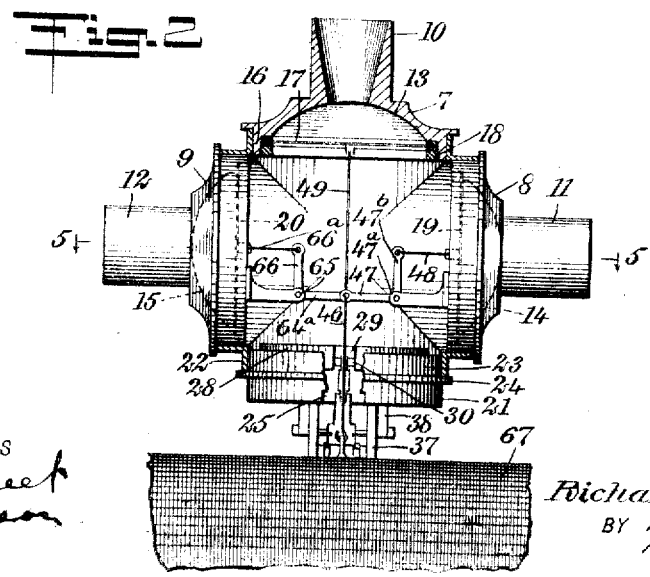

Figure 1 is a view partly in side elevation and partly in section, showing the reproducer complete, as viewed from a point at the right of Fig. 2; Fig. 2 is a view partly in section and partly in elevation, showing the reproducer complete as seen from a point at the left of Fig. 1; Fig. 3 is an enlarged fragmentary inverted plan of the reproducer, showing the various stylus levers and their respective mountings; Fig. 4 is a perspective showing the middle stylus lever, the universal joint by aid of which the lever is mounted, and the swinging bracket by aid of which the universal joint and the middle lever are connected; Fig. 5 is a horizontal section upon the line 5—5 of Fig. 2 looking in the direction of the arrows, and showing internally the bottom of the casing together with the bottom weight, and means for connecting two of the diaphragms with the stylus levers associated respectively with them; and Fig. 6 is a longitudinal section through one of the swinging brackets provided with a fork used as a mounting for each of the stylus levers.

A casing is shown at 6, and is provided with sound domes 7, 8, 9, each having substantially the form of a cap provided internally with a concave face 13, 14 and 15. I find that by using these sound domes and giving them the form indicated there is less interference of the sound waves, and the quality of the sounds is greatly improved. The sound domes are provided with necks 10, 11 and 12, to which are to be secured branches leading to the sounding horns of the phonograph. Each sound dome is provided with a thin annular threaded portion 16, and encircled by these portions 16 respectively are the diaphragms 17, 19, 20, each held in position by aid of a threaded ring 18, as will be understood from Fig. 2. Disposed at the bottom of the casing 6 and detachably connected therewith is a ring 21 provided with a neck portion 23, which fits concentrically into the neck portion 22 of the casing. The ring 21 is provided with a flange 24 which normally abuts squarely against the lower edge of the neck 22, as will be understood from Fig. 2. The ring 21 is slightly cut away at 25 so as to make room for some of the parts, and is provided internally with a shelf 26 having a general annular form. Mounted upon this shelf is a bearing 27 attached to which is a weight 28. This weight in its entirety is in approximately circular form, but is provided with a slot 29 extending substantially across it, the two halves of the weight being simply held together by cross bars 30—31. A pivot 32 connects the weight 28 with the bearing 27 and allows it to swing slightly under proper conditions.

Mounted integrally upon the edge of the ring 21 and depending there below are two bearings 33, and mounted upon the shelf 26 and extending there below are two pairs of bearings 34, 35. Journaled within the respective pairs of bearings 33, 34 and 35 are swinging brackets 36, 37, 38, the bracket 36 being shown in detail in Fig. 6 and the bracket 37 in Fig. 4. The bracket 36 is provided with lugs 39—40 integral therewith, and extending therefrom. Journaled within these lugs is a stub shaft 41 and mounted upon the latter is a fork 42. A stylus lever 43 is mounted upon a stub shaft 44 which is journaled within the fork 42. The stylus lever 43 carries a stylus jewel 45, which may be of the usual or any preferred construction.

A rod 46 connects the free end of the stylus lever 43 with an arm 47. The latter is mounted rigidly upon a shaft 47ª, and extending upwardly from this shaft is another arm 47ᵇ. A rod 48 connects the arm 47ᵇ with the diaphragm 19. A rod 49 is connected with the diaphragm 17 and extends downwardly so as to engage the free end of the stylus lever 50. This stylus lever carries a stylus jewel 51, and is mounted upon a stub shaft 52, the latter being journaled within a fork 53. The swinging bracket 37 is provided with lugs 54, 55. Journaled within the latter is a stub shaft 56, which is rigidly connected to the fork 53 so as to turn therewith. As the construction of the brackets 36 and 38 does not vary greatly from that of the bracket 37, a good representative idea of each of these brackets may be obtained by inspection of the bracket 37 shown in Fig. 4.

It will be noted that the stub shaft 56 extends in a general direction crossing the length of the shaft 52, but that the shaft 52 is not in the same plane as the shaft 56. This is because the fork 53 extends at its bottom slightly to the left, according to Fig. 4. The ultimate purpose of this arrangement is to improve the quality of the sound, and also prevents the stylus needle 50 from jumping relatively to the record. With the parts arranged as here shown the sensitiveness of the entire construction is greatly improved. By thus placing the shafts 52 and 56 in different planes, the shaft 52 being intermediate the jewel 51 and the shaft 56, the stylus lever 50 appears to have greater freedom than when the parts are mounted otherwise. Hence the stylus lever has greater liberty to respond to vibratory influences exerted upon and through the jewel 51. I have also found that placing the shaft 52 in a different vertical plane from that of the shaft 56 reduces the friction of the stylus needle 50. This is probably due to the increased freedom given to the stylus needle. The mechanical principle here involved may be best understood by imagining that the fork 53 extends a considerable distance to the left according to Fig. 4. This much being assumed, it will be noted that a given movement of the outer or left hand portion of the fork relatively to the axis of the shaft 56 as a center turns this shaft a lesser distance than would be the case if the fork 53 was very short, so that the axis of the shaft 52 coincided with the general axial direction of the shaft 56. In other words, by extending the fork 53 to the left so as to remove the shaft 52 away from the shaft 56 I virtually locate the shaft 52 at the long end of the lever virtually journaled upon the axis of the shaft 56. This unquestionably gives more movement to the stylus lever 50 in a horizontal direction, and in doing this it likewise gives it more movement in a vertical direction—that is, in a plane coinciding with the axis of the shaft 56. Any freedom of the stylus lever 50 which enables the jewel to follow a path of less resistance relatively to the record must have a tendency to increase the freedom of movement of the stylus lever in planes independent of that in which it receives its freedom initially. To state the same fact in a different way, freedom of movement given to the stylus lever in a horizontal plane enables the jewel to fit more accurately into the sound grooves, and in doing this the various elevations and depressions characteristic of the sound grooves are better able to exert their vibratory effect in a vertical direction.

Another stylus lever 57 is provided with a jewel 58, and is mounted upon a shaft 58ª, the latter being journaled in a fork 58ᵇ. This fork is mounted upon a stub shaft 59, similar to the stub shaft 56, this stub shaft being journaled between lugs 59ª similar to the lugs 54, 55 in Fig. 4. The stylus lever 57 is, therefore, mounted, by aid of the universal joint, in substantially the manner already described with reference to the stylus lever 50. A plate 38ª is mounted rigidly upon the bracket 38, and carried upon this plate 38ª is a weight 38ᵇ. A guide link 60 extends upwardly from the plate 38ª and engages a staple 61 for the purpose of preventing undue movement of the weight 38ᵇ. A rod 62 is journaled in a head 57ª, see Figs. 1 and 4, and extends upwardly therefrom to a weight 63. This weight is of substantially the same construction as the weight 38ᵇ above described, and by pressing downwardly upon the rod 62 the weight 63 presses the bracket 38 downwardly. A rod 64 is connected with the stylus lever 57, and extends upwardly therefrom, being journaled to an arm 64ª. This arm is mounted rigidly upon a rocking shaft 65. Extending upwardly from this rocking shaft is an arm 66 which is connected by a rod 66ª to the diaphragm 20. The record is shown at 67, and is engaged by three stylus needles which are disposed in tandem relatively to each other, as indicated relatively to Fig. 3, so that the various jewels carried by the stylus needles follow each other directly and in close succession in the groove.

The operation of my device may be readily understood from the foregoing description. The parts being adjusted and the record 67 being given a rotary motion, the various jewels track behind each other in the sound groove of the record, the result being that the three diaphragms are actuated at practically the same instant so that the sounds are greatly amplified. The concave form given to the inner surfaces of the sound domes greatly improves the effect. With this apparatus an ordinary record may be played many times in succession without the jumping of a single stylus lever. The wear upon the record is reduced to a minimum and every factor going to make up the general sound reproduced appears to be improved.

It will be noted that the necks 10, 11, 12 of the sound domes are located in a plane which crosses the general direction of travel of the record 67. This arrangement is of considerable value in practice for the reason that the drag of the record upon the jewels carried by the stylus levers is equalized in such manner that all the diaphragms are affected substantially alike. That is to say, the vibrations impressed upon the various stylus levers are so transmitted that neither diaphragm has any advantage over any other diaphragm in so far as one stylus lever being located ahead of another is concerned. For instance, as may be seen by comparing Figs. 2 and 5, the direction of travel of the record 67 being crosswise of the general plane of vibration of all of the diaphragms can not cause any accidental dragging effect of the jewel upon the record to carry any diaphragm in the particular direction in which the record is traveling or in the opposite direction. This is simply because the arms 47$^b$, 66 rock in planes which do not coincide with the plane representing the sound groove. Except for this provision, the accidental dragging of the jewel within the sound groove at any particular moment might directly influence the motions of the diaphragms because of a tendency for the sound groove to carry the stylus levers along with it as the record rotates.

In disposing the necks 10, 11, 12 in the same plane, I also accomplish another advantage, to wit, that the travel of the reproducer relatively to the sound record is rendered much easier, the unavoidable strain exerted by the branches upon the necks 10, 11, 12, being better equalized and the tendency of the reproducer to skip parts of the record is thereby greatly lessened.

In order to attain the practical advantages just stated, the arms 47, 64$^a$ are staggered relatively to each other, as will be understood from Fig. 5, the arm 47 being located adjacent to one end of the shaft 47$^a$, whereas the arm 64$^a$ is near the opposite end of the shaft 65. While this is the case, the rods 48, 66$^a$ are in substantial alinement relatively to each other. This disposition of the parts enables the arms 47, 64$^a$ to be spaced apart far enough to allow for the proper spacing of the three stylus levers relatively to each other and for the distribution of these levers in a general plane crossing at right angles the plane occupied by the three necks 10, 11, 12.

While I show as a representative form my device as applied to an ordinary cylinder phonograph, I do not limit myself in doing this, as the invention may be used in various forms as the latter may suggest itself.

Having thus described my invention, what I claim as new and desire to secure by Letters Patent is:

1. In a talking machine, the combination of a plurality of brackets, one bracket being wider than another so as to partially inclose the same, and a plurality of stylus needles mounted upon said brackets, said stylus needles being arranged in tandem for the purpose of following each other in a record groove.

2. In a talking machine, the combination of a plurality of swinging brackets, a plurality of stylus levers, a universal joint connecting one of said stylus levers with one of said brackets, each of said universal joints comprising two shafts occupying different planes for the purpose of increasing the freedom of movement of the stylus needle associated therewith, the several stylus needles being arranged in tandem for the purpose of following each other in a record groove.

3. In a talking machine, the combination of a plurality of swinging brackets arranged in tandem relatively to each other, a fork journaled upon each bracket and extending outwardly therefrom, a stylus lever journaled in each fork and free to rock in a plane coinciding with the axis of the revolution of said fork, the distance between the rocking axes of the bracket being further from the axis of said bracket than the distance of the rocking axis from the fork associated with said bracket is from the rocking axis of said bracket, said stylus levers being arranged in tandem for the purpose of following each other in a record groove.

4. In a talking machine, the combination of a revoluble sound record, a plurality of swinging brackets, a plurality of stylus levers connected with said brackets and arranged in tandem to each other in a plane coinciding with the direction of travel of said revoluble sound record, and universal joints connecting said brackets with said stylus levers for the purpose of increasing the independence of said stylus levers.

5. In a talking machine, the combination of a casing provided with a neck portion, a ring provided with a portion fitting detachably into said neck portion, said ring being provided with bearings and with a flange for engaging said neck portion, brackets journaled upon said bearings, and stylus levers mounted upon said brackets.

6. The combination of a casing provided with a neck portion, a ring provided with a portion fitting into said neck portion and further provided with a flange engaging said neck portion and serving as a limiting stop for said ring, stylus levers, and mechanism connecting said stylus levers with said ring.

7. The combination of a revoluble sound record, a casing disposed adjacent to said sound record and provided with a plurality of necks disposed in a plane crossing the general direction of travel of said record, a plurality of diaphragms mounted within said casing, each diaphragm being disposed adjacent to one of said necks for the purpose of throwing sounds thereinto, a plurality of stylus levers, mechanism connected with said casing for supporting said stylus levers, and connections from said stylus levers to said diaphragms.

8. In a talking machine, the combination of a casing, a plurality of diaphragms mounted therein, a plurality of rocking shafts mounted within said casing, each rocking shaft being disposed adjacent to a particular diaphragm wherewith it is associated, a plurality of arms one mounted upon each shaft, a connection from each arm to the particular diaphragm adjacent thereto, another arm mounted upon each shaft but at a point spaced apart, along the axis of said shaft, from the first mentioned arm located thereupon, and connected with a stylus lever.

9. The combination of a casing, diaphragms connected therewith, a plurality of rocking shafts mounted within said casing, a rocking arm connected rigidly with each rocking shaft, another rocking arm mounted upon each rocking shaft but spaced apart from said first-mentioned rocking arm in a general direction along the shaft, and connected with said diaphragms, and connections from said first-mentioned rocking arms to stylus levers.

In testimony whereof I have signed my name to this specification in the presence of two subscribing witnesses.

RICHARD BARTHOLOMEW SMITH.

Witnesses:
 WALTON HARRISON,
 EVERARD B. MARSHALL.